US012146652B2

(12) United States Patent
Greto et al.

(10) Patent No.: US 12,146,652 B2
(45) Date of Patent: Nov. 19, 2024

(54) REFILLABLE CANDLE

(71) Applicant: NABFLY, INC., New York, NY (US)

(72) Inventors: Leann Greto, New York, NY (US); Marcelo Cardoso, New York, NY (US); Tim Predzimirski, New York, NY (US); Rishi Prabhu, New York, NY (US); Steve Szaronos, New York, NY (US)

(73) Assignee: NABFLY, INC., New York, NY (US)

( * ) Notice: Subject to any disclaimer, the term of this patent is extended or adjusted under 35 U.S.C. 154(b) by 400 days.

(21) Appl. No.: 17/830,541

(22) Filed: Jun. 2, 2022

(65) Prior Publication Data

US 2023/0392782 A1 Dec. 7, 2023

(51) Int. Cl.

*F21V 35/00* (2006.01)
*C11C 5/00* (2006.01)
*F21V 21/096* (2006.01)

(52) U.S. Cl.

CPC ............ *F21V 35/003* (2013.01); *C11C 5/006* (2013.01); *F21V 21/096* (2013.01)

(58) Field of Classification Search

USPC .................................................. 431/288–297
See application file for complete search history.

(56) References Cited

U.S. PATENT DOCUMENTS 6,090,331 A 7/2000 Schwarz et al.
9,400,103 B1 * 7/2016 Cap ........................... F23D 3/24
2002/0048739 A1 * 4/2002 Chu .......................... F23D 3/16 431/291
2006/0057521 A1 * 3/2006 Kubicek ................... F23D 3/16 431/291
2006/0057522 A1 * 3/2006 Kubicek ................... F23D 3/16 431/291
2006/0263733 A1 * 11/2006 Furner .................... F21V 35/00 431/292
2008/0254398 A1 * 10/2008 Chadha ..................... F23D 3/16 431/291

FOREIGN PATENT DOCUMENTS

| | | | |
|---|---|---|---|
| CA | 2772455 | C | 5/2018 |
| CN | 203131440 | U | 8/2013 |
| CN | 105114922 | A | 12/2015 |
| EP | 3228934 | B1 | 11/2018 |
| EP | 2752619 | B1 | 2/2019 |
| KR | 20120138420 | A | 12/2012 |
| WO | 95/24588 | A1 | 9/1995 |

* cited by examiner

*Primary Examiner* — Ko-Wei Lin
(74) *Attorney, Agent, or Firm* — Buchanan Ingersoll & Rooney PC

(57) ABSTRACT

A refillable candle system includes an outer container having an outer wall and a base configured to support the outer container on a flat surface; the outer container includes an aperture extending all the way through the base; the base of the outer container further includes a recess; a magnet secured in the recess that is exposed to an interior of the outer container; and one or more inner containers that fit within the outer container, the inner container being comprised of a material that is attracted to the magnet; the inner container being filled with a burnable substance and wick.

13 Claims, 2 Drawing Sheets

REFILLABLE CANDLE

An object of the application is to provide a decorative and ornamental refillable candle system that includes a reusable aesthetic outer container and a plurality of disposable inner containers that include candle wax and a wick, or equivalent materials. The disposable inner containers function as refills for the outer container. The refills are easy to install and easy to replace.

BACKGROUND

U.S. Pat. No. 6,090,331 discloses a method of manufacturing gel candles having non-metal core wicks. The method involves using a non-metal wick 23 that is secured by a metal wick clip 23. A container 21 is filled partially or completely with a gel forming liquid composition 22 and the wick and wick clip 23 is inserted into the composition 22. The container 21 is then placed above a magnet 26. The magnet attracts the metallic wick clip 23 down to the base of the container 21. Once the liquid composition hardens, the candle may be removed from the magnet. In other words, the magnet 26 is used solely to position the wick clip 23 while forming the candle. It is not used after the candle is formed.

DETAILED DESCRIPTION OF THE PREFERRED EMBODIMENTS

Figure 1:
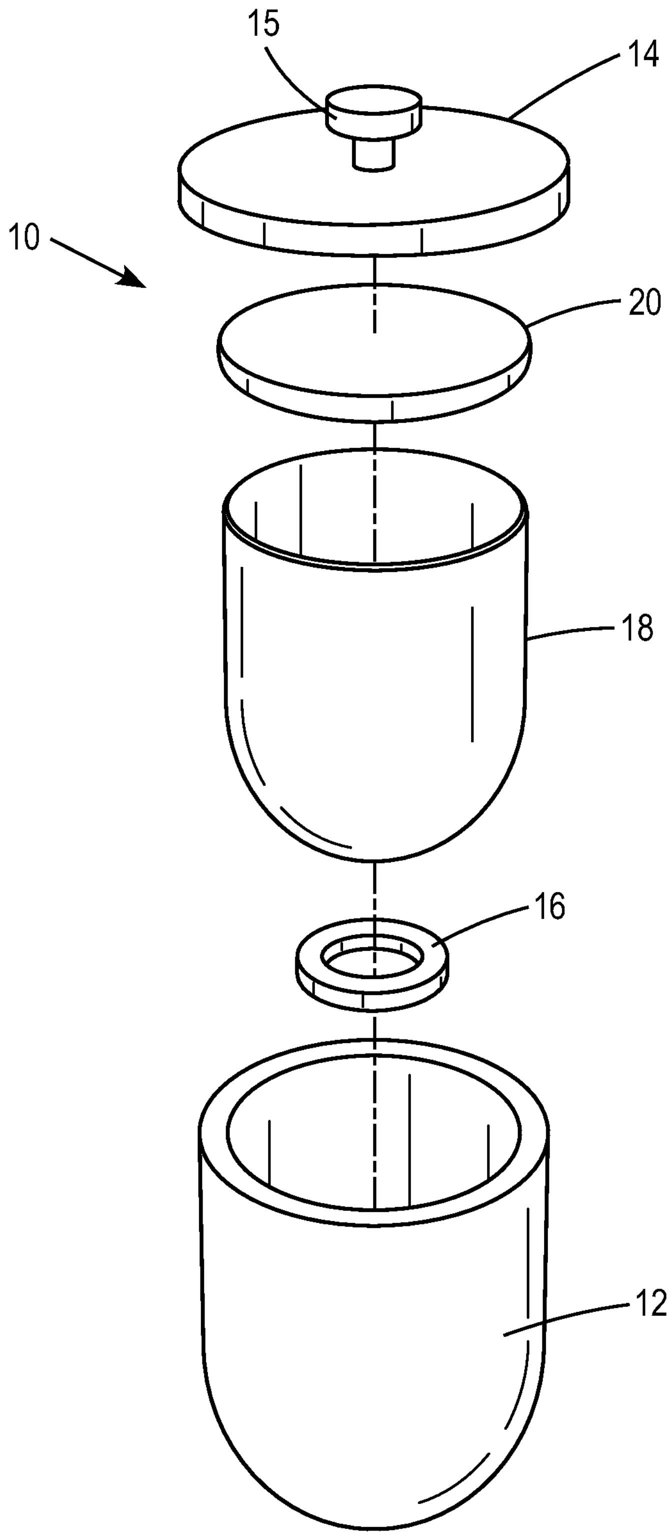
FIG. 1 illustrates an exploded view of one embodiment of the present invention.

FIG. 1 is an exploded view of one preferred embodiment of a refillable candle system 10 that includes an outer container 12 and an outer container cap 14 that is configured to fit on top of the outer container 12. An inner container 18 and inner container cap 20 fit within the outer container 12.

The outer container cap 14 may have a knob 15 with a knurled texture on the sides that can be used with a strike-anywhere match. In one embodiment, the knob 15 is made of brass. As explained in greater detail below, the outer container 12 and the outer container cap 14 are intended to be reused.

Although the outer container 12 and the cap 14 may be of any desired size and shape, in one preferred embodiment, the outer container 12 has a height of about 106.3 mm and an outer diameter of about 92.8 mm. The bottom of the container 12 may include a flat base of with a diameter of about 41 mm. The wall of the outer container 12 may be about 8 mm in thickness. The cap 14 preferably has an outer diameter of about 93 mm and a thickness of about 10 mm.

The outer container 12 may be made of any material including, but not limited to, ceramic (glazed or unglazed), concrete, stoneware, plastic, marble, alabaster, onyx, clear or frosted glass, terracotta, wood (all species), cork (real or faux), or metal. The metal may be one or more of steel (carbon, alloy, or stainless), aluminum, copper, brass, bronze, zinc, or titanium. Furthermore, the outer container 12 may be made from any combination of such materials.

If desired, the exterior of the outer container 12 may be marked with text, such as logos, or any other decorative design. The markings may be engraved or printed, or by any other suitable means.

Figure 2:
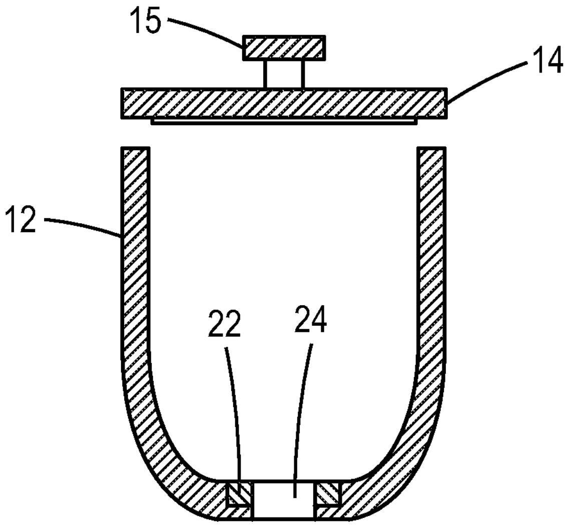
FIG. 2 illustrates a cross-sectional view of a portion of the embodiment of FIG. 1.
Figure 4:
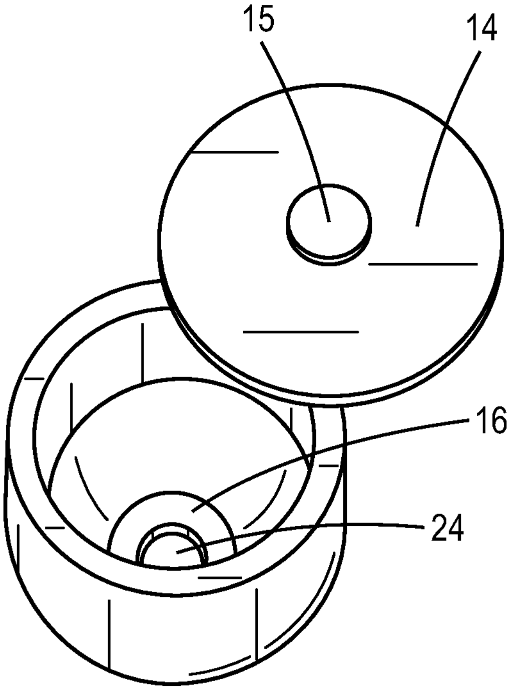
FIG. 4 discloses a perspective view of portions of the one embodiment.
Figure 3:
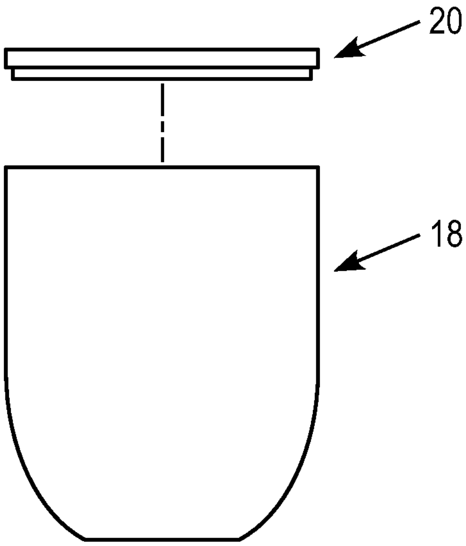
FIG. 3 discloses a detailed view with dimensions of a portion of a preferred embodiment.

As can be seen in FIGS. 2 and 4, at the base of the outer container 12 is an aperture 24, preferably made in the center of the base. In one embodiment, the diameter of the aperture 24 is about 15 to 18 mm. Ideally, the aperture 24 should allow a finger or push rod to be inserted therethrough.

Surrounding the aperture 24 is a recessed groove 22 having a width of about 5 mm, a depth of about 6 mm, an outer diameter of about 31.7 mm, and an inner diameter of about 18 mm. The illustrated aperture 24 and groove 22 are examples of a preferred embodiment. In practice, the aperture 24 and the groove 22 can be made in any shape, size, and relationship with respect to each other that enables an objective of the application to be achieved.

As also seen in FIGS. 1 and 2, a magnet 16 is secured in the recessed groove 22. The magnet 16 can be secured by means of a tight fit within the groove 22 or can be secured with adhesive or glue. In the preferred embodiment the magnet 16 is annular in shape. However, the magnet 16 can be made in any shape that enables an objective of the application to be achieved.

Preferably, the magnet 16 is of an N35 material having a field strength of about 270 kiloamperes/meter (kA/m). However, the magnet 16 can be made from other materials and strengths that enable an objective of the application to be achieved.

The inner container 18 is made of an inexpensive thin metallic material that is attracted to the magnet 16. Preferably the inner container 18 is made of such a thin and inexpensive material that the user of the system will not hesitate to dispose of, or recycle, the inner container when finished. In one embodiment, the thickness of the inner container wall is about 0.8 to 1.0 mm.

In one embodiment, the inner container 18 has an outer diameter of about 75 mm and a height of about 89 mm. The inner container 18 should fit within the outer container 12. The inner container 18 can be made in any size and shape that enables an objective of the application to be achieved.

Furthermore, the inner container 18 may have a rolled or corrugated edge at the top that enables the inner container 18 to expand and contract without cracking either the inside container 18 or the outside container 12 during use.

A cover 20 may be provided to fit on the inner container 18. In one embodiment, the cover 20 has an outer diameter of about 75 mm and a height of about 10 mm. A recessed edge of about 2.7 mm may be provided on the bottom of the cover 20 to facilitate seating on the inner container 18.

The cover 20 for the inner container and the cover 14 for the outer container are both optional.

As illustrated in FIG. 5A, the inner container 18 is filled with candle wax 26 and one or more wicks 28. One skilled in the art will recognize that there are other suitable materials that can be used instead of traditional candle wax and candle wicks. In addition, the candle wax 26 may be dyed or tinted to any desirable color. And, the candle wax may be scented to provide an appealing smell. In other embodiments, additives can be included in the inner container 18 with the candle wax 26. For example, seeds, twigs, consumables, or other hardgoods, may be added to the candle wax 26.

Alternatively, the inner container 18 could be filled with materials other than candle material. For example, it could be filled with consumables or plants.

Ideally, the outer container 12 and cover 14 are elaborate and appealing, whereas the inner container 18 may be inexpensively made such that it can be conveniently replaced when finished and disposed of or recycled.

According to one embodiment, the magnet 16 is strong enough such that it attracts the inner container 18 with a detectible and/or audible click. Such attraction makes the user feel that the inner container 18 is securely arranged within the outer container 12.

Furthermore, because the inner container 18 is secured to the outer container 12 with the magnet 16, the aperture 24 is provided in the base of the outer container 12 so that the user can insert a finger or other object into the aperture 24 in order to release the inner container 18 from the outer container 12.

Accordingly, the invention enables a user to have an aesthetic outer container 12 and a relatively inexpensive refill, i.e., the inner container 18.

With regard to the ornamental features, any text, logos, or images may be disclaimed in some embodiments. And, where photographs of certain embodiments are illustrated, Applicant further claims protection for corresponding line drawings of such features.

What is claimed is:

1. A refillable candle system comprising:

an outer container having an outer wall and a base configured to support the outer container on a flat surface;

the outer container includes an aperture extending all the way through the base;

the base of the outer container further includes a recess;

a magnet secured in the recess that is exposed to an interior of the outer container; and one or more inner containers that fit within the outer container, the one or more inner containers being comprised of a material that is attracted to the magnet;

the one or more inner containers being filled with a burnable substance and wick.

2. The refillable candle system of claim 1, further comprising a cover for the outer container.

3. The refillable candle system of claim 1, further comprising a cover for the one or more inner containers.

4. The refillable candle system of claim 2, further comprising a cover for the one or more inner containers.

5. The refillable candle system of claim 2, further comprising a knurled knob on the cover for the outer container.

6. The refillable candle system of claim 1, wherein the aperture is circular and the recess is annular.

7. The refillable candle system of claim 6, wherein the aperture is in the center of the annular recess.

8. The refillable candle system of claim 1, wherein the base has a flat surface on a bottom of the outside container.

9. The refillable candle system of claim 1, wherein the outer container is made from ceramic, stoneware, plastic, marble, wood, cork, or metal.

10. The refillable candle system of claim 9, wherein the outer container is made from brass.

11. The refillable candle system of claim 1, wherein the outer container is made from a combination of ceramic, concrete, stoneware, plastic, marble, wood, cork, and/or metal.

12. A method of using a refillable candle system, comprising:

providing an outer container having an outer wall and a base configured to support the outer container on a flat surface, wherein the base of the outer container includes a recess and a magnet is secured in the recess;

inserting one inner container containing a burnable composition and wick into the outer container, wherein the inner container is made of a material that is attracted to the magnet; and removing the one inner container from the outer container by inserting an object into an aperture in the base of the outer container.

13. The method of claim 12, further comprising inserting a new inner container into the outer container after the one inner container is removed from the outer container.

* * * * *